W. M. THOMAS.
METHOD OF FEEDING FILMS.
APPLICATION FILED NOV. 18, 1915.

1,244,920.

Patented Oct. 30, 1917.

Inventor
William M. Thomas
By Attorney
Robert Magrane

UNITED STATES PATENT OFFICE.

WILLIAM M. THOMAS, OF NEW YORK, N. Y., ASSIGNOR, BY MESNE ASSIGNMENTS, TO THOMAS-OBERKIRCH COMPANY, LIMITED, OF NEW YORK, N. Y., A CORPORATION OF NEW YORK.

METHOD OF FEEDING FILMS.

1,244,920.   Specification of Letters Patent.   Patented Oct. 30, 1917.

Application filed November 18, 1915. Serial No. 62,171.

*To all whom it may concern:*

Be it known that I, WILLIAM M. THOMAS, a citizen of the United States, residing at New York, in the county of New York and State of New York, have invented new and useful Improvements in Methods of Feeding Films, of which the following is a specification.

This invention relates to methods of intermittently feeding picture strip film.

The objects of the invention include an increase in speed of the film movement, a reduction in vibration due to intermittent film movement, avoidance of wear upon the film, and the elimination of complex mechanism.

Referring to the drawings.

A high speed film movement is of the greatest importance. Under methods heretofore adopted, the movement of the film is comparatively slow and is for various reasons unavoidably so. In projection work this slowness results in loss of light upon the screen, and in the case of pictures projected for scientific analysis of motion, it gives unsatisfactory results; it is also one of the greatest obstacles to the photography and projection of moving pictures in color.

In common projection at the rate of 16 pictures per second, the light has to be cut off by the shutter from one-fourth to one-sixth of the time in order to permit the feeding forward of the film. The effect of the shutter so operating is so disagreeable that "flicker" blades, or additional shutters are added to reduce the flicker, but while the result is greatly improved, they cause a further loss of light upon the screen which totals up to about fifty per cent.

In the projection of pictures for the analysis of motion, as in the illustration of surgical operations, it is necessary at times to feed the pictures very slowly to show the motion in full detail. At the ratio of picture time to shutter time is usually 5 or 6 to 1 and the ratio remains constant, for all speeds of operation, it is obvious that the cutting off of light by the shutter forms a disagreeable and annoying interruption to the succession of pictures, when the speed of the machine is lowered. This feature is so objectionable as to destroy in great part the value of projectors for this service.

In color work, the number of exposures per second is increased from 16 to 32 or to 48, and the amount of exposure for each picture becomes so small that this art has made but slow progress.

Under methods heretofore adopted for moving the film, vibration is a great evil. Whether the Geneva stop, or intermittent sprocket be used, or the intermittent grip, or the film-beater method, in each case intermittent mechanism of considerable weight and having considerable movement is necessary, and this gives rise to the practice of mounting projectors upon pedestals weighing hundreds of pounds, and also acts to reduce the operative speed and efficiency of cameras.

The wear upon the film is also a serious item. In the faster types of intermittent mechanism now used, the wear upon the film is very great, and these machines have been abandoned in many cases for the slower types of mechanism in order to reduce the excessive wear upon the film.

My improved method gives to the film an exceedingly high speed; there is lessened vibration, as intermittent sprockets, grips, or film-beaters are eliminated; and there is but little wear upon the film.

Figure 1:
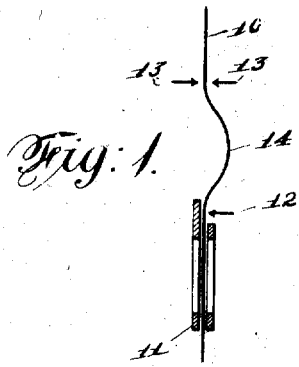
Figure 1 is a diagrammatic view representing the position of the film immediately before it is advanced a unit distance.
Figure 2:
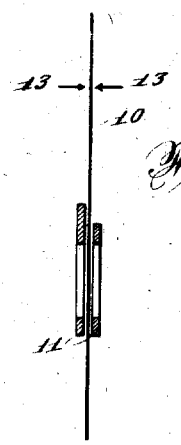
Fig. 2 is a similar diagrammatic view showing the film after its advance.

This new method consists mainly in utilizing the resilience of the film, reinforced if desired, storing up power therein, to advance itself a unit distance. In Fig. 1 the film is indicated at 10; the light aperture or "gate" at 11. If the film be pressed at and in the direction of the arrow 12 against the gate and the film seized at the arrows 13, 13 and moved downward, a loop 14 will be formed, as indicated in the figure. Owing to the inherent resilience of the film, this loop or bent portion of the film is under a compressive stress in the direction of its length and has a certain amount of stored up energy similar to a compressed spring. Upon withdrawing the pressure of resistance at 12, as shown in Fig. 2, the loop will straighten out, and the energy stored therein will cause the film to move downward through the gate the unit distance. This movement is very rapid.

Figure 3:
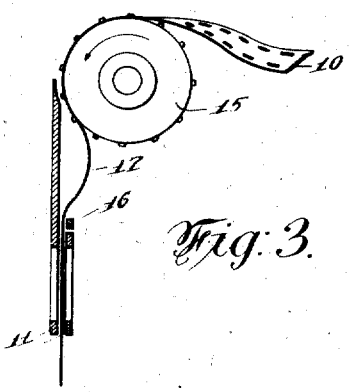
Fig. 3 is a view, partly diagrammatic, showing mechanism for carrying out the method shown in Figs. 1 and 2.

A mechanism carrying out this method is indicated in Fig. 3 in which 15 represents a continuously moving sprocket feed drum and 16 an intermittently operable clamping device that clamps the film periodically between itself and the wall of the gate. The movements of the sprocket drum 15 and the clamping device 16 are so related that the excess film forming the loop 17 is equal in amount to the unit distance of the film to be advanced.

Figure 4:
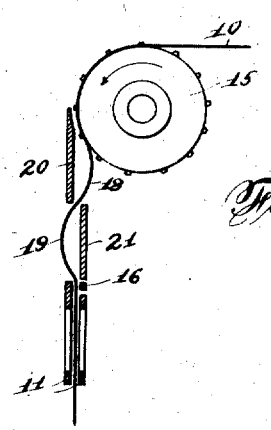
Figs. 4, 5, and 6 are partly diagrammatic views showing various modifications in the method of feeding the film.

In Fig. 4, a mechanism is disclosed in which a double loop 18, 19 is formed between the plates 20, 21. The operation is the same as that already described, this arrangement differing in that an increased speed for the film is obtained.

Figure 5:

In Fig. 5, the mechanism is similar to that shown in Fig. 3, except that the resilience of the film is reinforced by light leaf springs, one of which is shown at 22, bearing upon the borders of the film.

Figure 6:
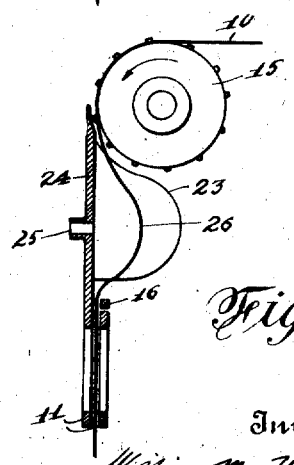

In Fig. 6, a pneumatic device is shown by which the resilience of the film is increased. Upon each edge of the film is located a metal plate, one of which is shown at 23, which project from the back plate 24. The plate 24 is pierced for a tube 25 which communicates with a suitable intermittent suction pump or valve. Through tube 25 the air between the plates 23 and under the loop 26 is exhausted, causing more or less excess pressure upon the convex side of the loop and thereby increasing the compressive stress in the direction of the length of the film. As the loop straightens out the suction is relieved.

Under methods heretofore adopted, the film is mechanically gripped at its perforated edges and is advanced by means of the perforations. The power is necessarily applied suddenly to the perforations and the film is often torn apart by this sudden application of force to a relatively small and weak part of the film. In my improved method, the energy is gradually stored in the film by deforming the film into a bent loop, which is under a spring compression, and when the stress in the film is relieved the film advances the required distance under stored energy operating upon the whole body of the film loop. This distribution of the driving power throughout the entire body of the advancing film eliminates all tearing of the film and the greatest part of the wear.

The previous methods further require intermittently moving masses of considerable weight and extent of motion. They have been necessary as the power to move the film is transmitted through them to the film. In my improved method there is no intermittent movement of mechanism except the small light clamp 16 which does not have to transmit the power to move the film, but operates only to offer and withdraw resistance to the forward movement of the film and to clamp the picture in the gate during the time of its projection.

In my improved method, the movement of the film is so rapid that the shutter and flicker blades may be discarded from a projector and a succession of pictures thrown upon the screen without creating any substantial flicker or substantial break in the projected movement. This is possible only because of the extremely high speed with which the film intermittently moves.

I claim:—

1. The method of intermittently feeding picture strip film which consists in clamping the film at a given point to prevent movement of the film at that point, simultaneously moving the film forward in the direction of the clamped portion, thereby subjecting the intermediate portion of the film to a compressive stress in the direction of its length and then unclamping the film to permit said stress to advance the film forward a unit distance.

2. The method of intermittently feeding picture strip film which consists in clamping the film at a given point to prevent movement of the film at that point, simultaneously forming a loop behind the clamped portion and unclamping the film to allow the loop to straighten and to advance the film forward a unit distance.

3. The method of intermittently feeding picture strip film which consists in moving a portion of the film continuously and positively in a forward direction and creating therein a stress sufficient to advance the film, and intermittently offering and withdrawing a resistance to the forward movement of another portion of the film.

4. The method of intermittently feeding picture strip film which consists in moving a portion of the film continuously against a resistance offered to the movement of the film, whereby energy is stored in the advancing film, and intermittently withdrawing the resistance whereby the said stored energy is utilized to quickly advance the film a unit distance.

5. The method of intermittently feeding picture strip film which consists in intermittently forming a stress in the film by its forced advance movement, and feeding the film a unit distance by intermittently relieving the film of stress.

6. The method of intermittently feeding picture strip film which consists in intermittently forming a stress in the film by its continuous forced advance movement, and feeding the film intermittently a unit distance by intermittently relieving the film of stress.

7. The method of intermittently feeding picture strip film which consists in storing up energy in the film by deformation of the film and then utilizing the said energy to advance the film a unit distance.

8. The method of intermittently feeding picture strip film which consists in storing up energy in the film by the springing or bending of the film, and then permitting said energy to advance the film a unit distance.

9. The method of intermittently feeding picture strip film which consists in applying a compressive force to the film whereby energy is stored in the film, in the direction of its length and then causing the said force to advance the film in the direction of its length a unit distance.

10. The method of intermittently feeding picture strip film which consists in forming a loop between the light aperture and the feeding drum and causing the loop to store up energy and to increase and decrease periodically for each individual picture, and causing the stored energy to advance the film a unit distance.

11. The method of intermittently feeding picture strip film which consists in storing energy in a resilient film and intermittently using said energy to move the film whereby a continuous movement of a portion of the film is converted into an intermittent movement for another portion of the film.

12. The method of intermittently feeding a portion of a film which consists in periodically holding a portion of the film stationary; then forcibly feeding an adjacent portion of the film in the direction of its length a distance sufficient to accumulate a surplus of film equal to the distance the film is to be fed forward; storing energy during the accumulation of the said surplus length of the film; and then releasing the portion held and permitting the stored energy to feed said held portion forward to take up the surplusage accumulated as specified.

13. The method of intermittently feeding a moving picture film which consists in holding a portion of the film stationary; forming a loop adjacent the stationary portion; storing up energy during the formation of said loop; then releasing the stationary portion and causing the energy stored to move the said stationary portion forward a predetermined distance.

WILLIAM M. THOMAS.